(12) United States Patent
Wood et al.

(10) Patent No.: US 8,459,685 B2
(45) Date of Patent: Jun. 11, 2013

(54) DETACHABLE GOOSENECK FOR HEAVY HAUL TRAILERS

(75) Inventors: Ron Wood, Richmond (CA); Graham Street, Richmond (CA)

(73) Assignee: Aspen Custom Trailers, Richmond, British Columbia (CA)

( * ) Notice: Subject to any disclaimer, the term of this patent is extended or adjusted under 35 U.S.C. 154(b) by 492 days.

(21) Appl. No.: 12/779,750

(22) Filed: May 13, 2010

(65) Prior Publication Data

US 2011/0278821 A1 Nov. 17, 2011

(51) Int. Cl.
*B62D 53/06* (2006.01)

(52) U.S. Cl.
USPC ............................................. 280/441.2

(58) Field of Classification Search
USPC .......................................... 280/441.2, 425.2
See application file for complete search history.

(56) References Cited

U.S. PATENT DOCUMENTS

| | | | |
|---|---|---|---|
| 2,545,584 A | 3/1951 | Meadows | |
| 2,663,574 A * | 12/1953 | Martin | 280/417.1 |
| 2,894,764 A | 7/1959 | Ronk | |
| 2,907,581 A * | 10/1959 | Talbert | 280/425.2 |
| 2,944,834 A | 7/1960 | Hill | |
| 3,030,126 A * | 4/1962 | Martin | 280/425.2 |
| 3,066,954 A | 12/1962 | Brockman | |
| 3,632,139 A | 1/1972 | Stafford | |
| 3,698,582 A * | 10/1972 | Weinmann | 414/481 |
| 3,866,947 A | 2/1975 | Yakubow | |
| 3,986,726 A | 10/1976 | Vos et al. | |
| 4,390,192 A * | 6/1983 | Wagner | 280/441.2 |
| 4,423,885 A | 1/1984 | Carney et al. | |
| 4,513,987 A | 4/1985 | Whitaker et al. | |
| 4,765,638 A | 8/1988 | Kulyk | |
| 5,435,586 A * | 7/1995 | Smith | 280/425.2 |
| 6,378,887 B2 * | 4/2002 | Landoll et al. | 280/425.2 |
| 6,932,372 B2 * | 8/2005 | French et al. | 280/417.1 |
| 7,207,587 B1 * | 4/2007 | Wall | 280/425.2 |
| 7,520,524 B2 * | 4/2009 | Smith | 280/425.2 |
| 2003/0042705 A1 * | 3/2003 | French et al. | 280/417.1 |
| 2004/0169348 A1 * | 9/2004 | Winckler | 280/425.2 |

FOREIGN PATENT DOCUMENTS

| | | |
|---|---|---|
| CA | 2080446 | 1/1994 |
| EP | 0012121 B1 | 1/1984 |
| GB | 2137151 A | 10/1984 |

* cited by examiner

*Primary Examiner* — Tashiana Adams
(74) *Attorney, Agent, or Firm* — Smiths IP; Paul Smith

(57) ABSTRACT

A removable gooseneck hitch assembly transitions between an afterward position for hitching to a low bed trailer deck and a forward position by a pivoting arm that moves the forward end of the gooseneck an arcuate path. The invention minimizes the opportunity for debris to interfere with the sliding track assemblies known in the prior art. The assembly provides three degrees of freedom for the gooseneck in low bed mode and restricts the degrees of freedom in vehicle towing mode. A locking member for securing a low bed trailer hitch is also disclosed.

17 Claims, 19 Drawing Sheets

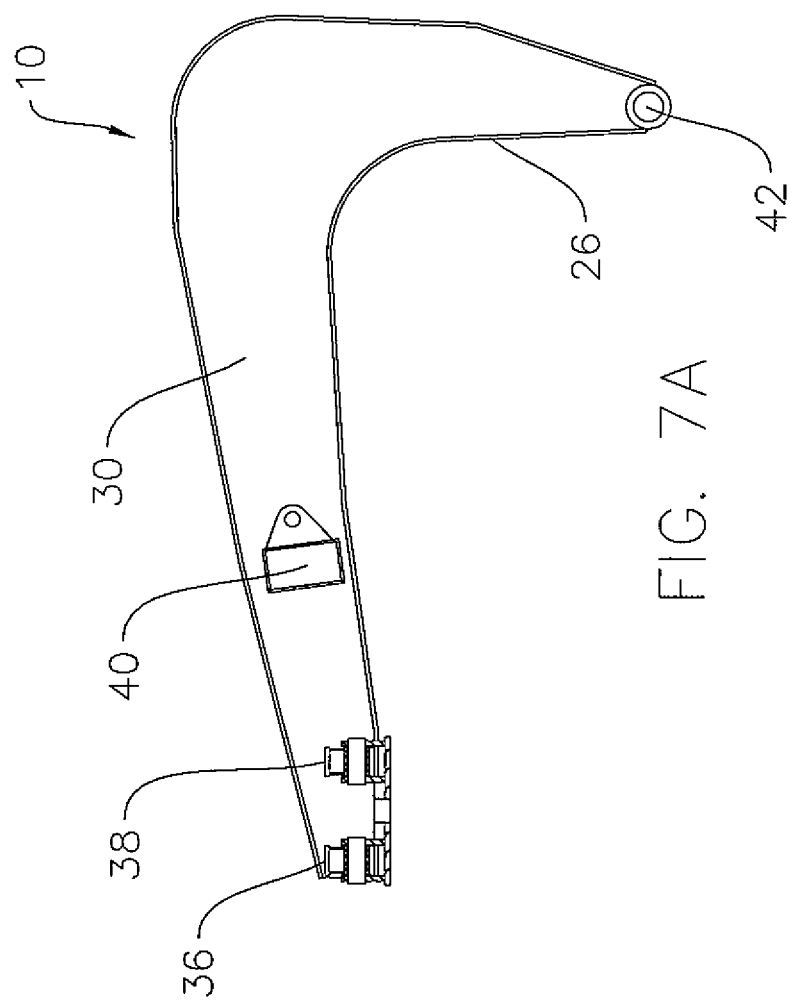
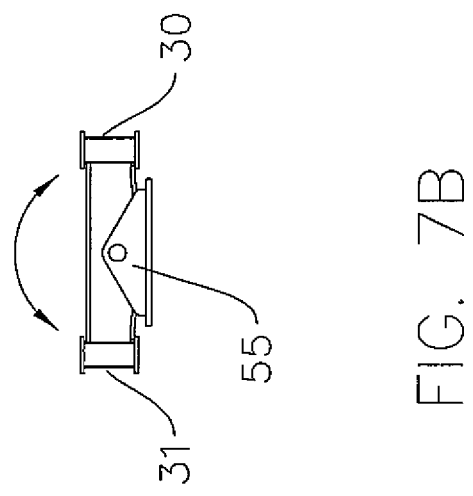
FIG. 7A
FIG. 7B

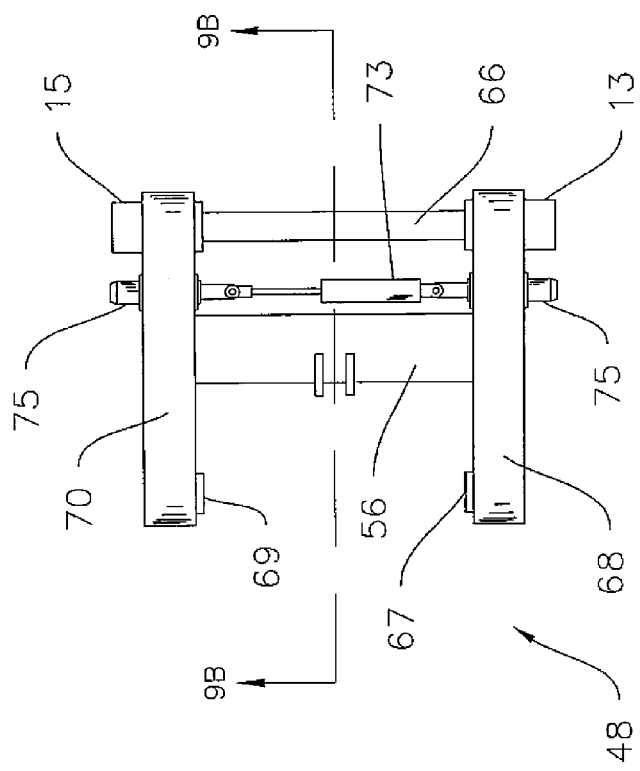
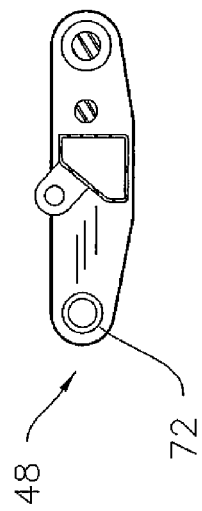

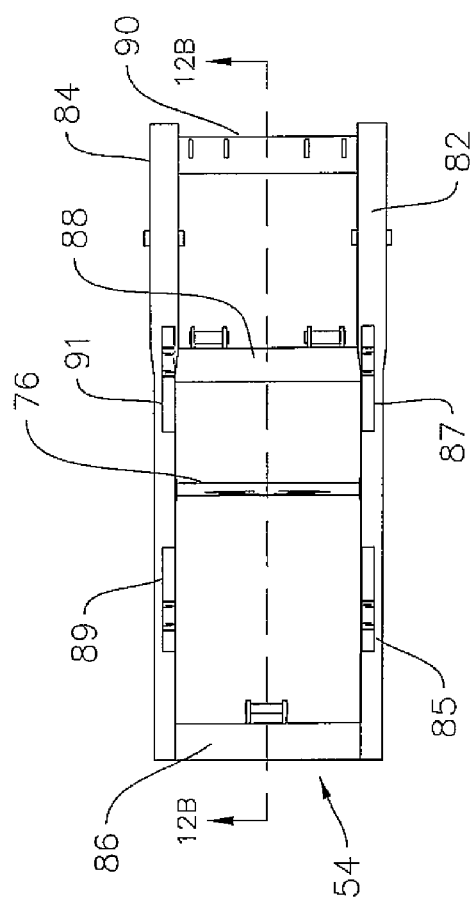
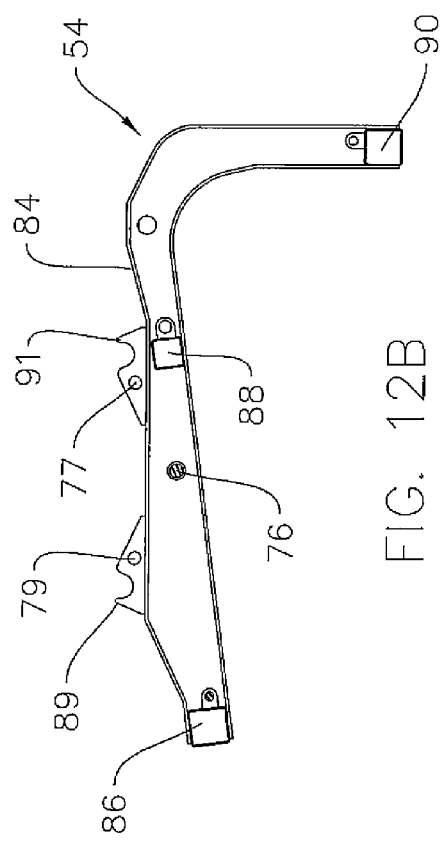
FIG. 12A
FIG. 12B

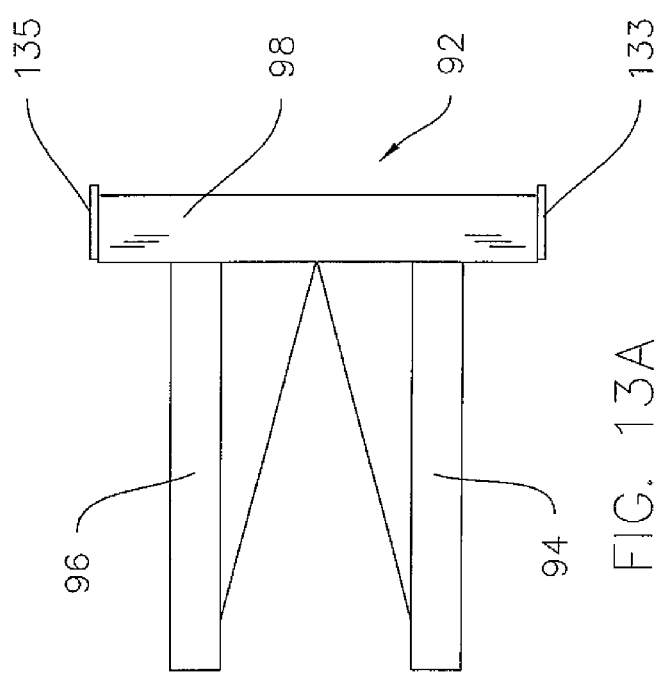
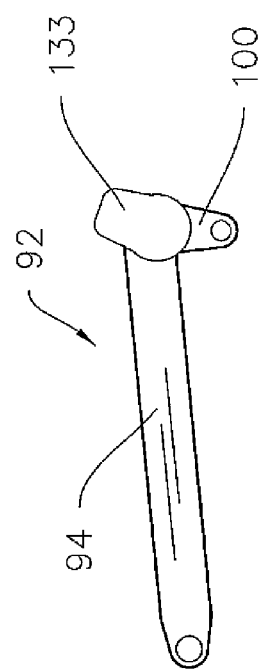
FIG. 13A
FIG. 13B

DETACHABLE GOOSENECK FOR HEAVY HAUL TRAILERS

FIELD OF THE INVENTION

This invention relates to hydraulic gooseneck hitches for heavy haul trailers. In particular, this invention relates to an articulation mechanism for a gooseneck arm, to means for hitching the gooseneck and hitch assembly to a low bed trailer deck or to a towed vehicle, to means for transitioning between the low bed mode and the towed vehicle mode, and to means for locking the gooseneck and hitch assembly to a low bed trailer deck.

BACKGROUND OF THE INVENTION

Sliding fifth wheel and gooseneck assemblies have been a common feature of heavy haul low bed semi trailers for several decades. They are found on every type of truck and trailer combination from on-road 30 ton single axle jeeps to off-road 200 ton mine trailers. The sliding assemblies are used to move the down or bearing point of the semi-trailer forward or backward to change the weight distribution on the tractor vehicle, in some cases to accommodate a transition from towing a low bed deck to towing an incapacitated vehicle. Such an assembly must also be capable of lowering the hitch assembly to allow it to be attached to a low bed deck, and of raising it to provide ground clearance when the deck is unhitched.

Examples of sliding fifth wheel and gooseneck assemblies are provided in Canadian Patent No. 2,080,446 and in the trailers manufactured by Kalyn Siebert, Peerless Limited, Scona Trailer Manufacturing, XL Specialized Trailers Inc., Cozad Trailers Sales LLC, Trail King Industries and Murray Trailer.

While several variations of sliding fifth wheel and gooseneck assemblies exist, they are all subject to a significant limitation—they can get stuck. Heavy-haul low bed trailers work in sometimes very harsh environments such as mines and they spend the majority of their life unprotected from the elements and from local debris. As a result, it is common for the sliding mechanisms to become contaminated with moisture that can freeze or rust the mechanism, or with rocks, dust or other debris that can create resistance or jam the unit completely. As the sliding mechanism is located atop the tractor vehicle, it is effectively out of reach on larger mine trucks and therefore it is difficult for an operator to inspect it prior to or during operation, thereby making it inconvenient to keep the mechanism free of debris.

Some prior art mechanisms get stuck without the introduction of contaminants. Simple sliding mechanisms comprised of a rectangular plate in a slightly larger rectangular track can become jammed as a result of misalignment of the two pieces. The fact that such units are continually connected and disconnected from a very large pieces of equipment and that they carry a very large load increases the risk of bending and distortion of the sliding track components.

It is therefore an object of the present invention to provide an articulation mechanism for a hydraulic removable gooseneck that avoids the jamming that characterizes sliding fifth wheel and gooseneck assemblies.

It is a further object of the invention to provide a connection between the gooseneck and the tractor vehicle that provides three degrees of freedom of movement between them in the low bed mode and that restricts those three degrees of freedom in the vehicle towing mode.

The transition between the low bed mode and the vehicle towing mode involves moving the gooseneck between a forward and an aft position on the tractor vehicle. The transition typically involves considerable stresses on the sliding mechanism and on the sub-frame that is installed on the tractor vehicle bed to support the gooseneck and the associated components. It is a further object of the present invention to minimize the stresses on the articulation mechanism and sub-frame of a gooseneck during the transition between the low bed mode and the vehicle towing mode.

As the gooseneck connection is detachable from the low bed trailer deck, a locking mechanism is usually provided to secure the hitching mechanism when the low bed deck is hitched to the gooseneck and hitch assembly. Providing such a lock is prudent from a safety standpoint, but the lock mechanism does not provide significant additional strength to the gooseneck connection. Some prior art systems attempt to assist the gooseneck in connecting to the trailer by applying a pulling force during connection to bring the two parts of the connection (trailer and tractor vehicle) closer together to complete a snug connection. That is not easy to achieve with the large equipment involved unless the design, manufacturing, operation, and environment are very specific. In practice, attempts to force the gooseneck and trailer together result in additional stresses being added to the connection and part failure, due in part to the fact that the size and power of the lock assemblies are significantly less than those of the gooseneck and trailer (especially a loaded trailer).

It is therefore a further object of the present invention to provide a simple but effective locking mechanism for a gooseneck to low bed deck hitch.

These and other objects of the invention will be better understood by reference to the detailed description of the preferred embodiment which follows. Note that not all of the objects are necessarily met by all embodiments of the invention described below or by the invention defined by each of the claims.

SUMMARY OF THE INVENTION

The present invention avoids the use of a sliding gooseneck assembly to transition between forward and afterward positions by instead pivoting the base of the gooseneck at the end of a pivoting member so that the base of the gooseneck travels along an arcuate path. This reduces the point of moving contact between the tractor and the gooseneck to one or more coaxial pivot points rather than through a slide track, thereby minimizing the opportunity for jamming through debris or other contaminants.

According to the preferred embodiment, a pivoting arm assembly is mounted to the tractor and the forward end (base) of the gooseneck is attached to a portion (preferably the end) of the pivoting arm assembly that undergoes arcuate travel.

Apart from avoiding the problems inherent in the use of sliding mechanisms in contaminant-laden environments, the pivoting arm assembly articulation enables the rear of the gooseneck and hitch assembly to be supported on the ground while the gooseneck is moved between the two positions. This significantly decreases the load that the articulation mechanism needs to support.

In another aspect, the invention comprises a locking mechanism for the deck hitch of a detachable gooseneck trailer. The locking mechanism comprises a locking member that pivots from a pivot point that is rearward of an afterward-opening hitch recess. In a more particular aspect, the hitch recess is provided on a hitch assembly that is pivotally attached to the end of the gooseneck. In a further aspect, the locking member has a substantially flat surface for abutting a hitch shaft of a trailer deck.

In a further aspect, the locking member is actuated by a hydraulic cylinder that actuates a rotating member. A second link is pivotally attached to the rotating member and to the locking member. When the locking member is in the lock position, three pivot points are substantially aligned: the pivot point of the rotating member, the pivot between the rotating member and the second link, and the pivot between the second link and the locking member. The aligned pivots provide mechanical resistance to articulation of the locking member thereby offering a failsafe if the hydraulic cylinder fails.

In another aspect of the invention, the forward end of the gooseneck is pivotable in relation to the tractor about a vertical axis, about an axis that is transverse to said tractor vehicle and about a longitudinal axis of the tractor.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The invention will be described by reference to the detailed description of the preferred embodiment and to the drawings thereof in which:

FIG. 7A is a vertical section of the gooseneck taken along line 7A-7A of FIG. 3B;

FIG. 7B is a front view of the forward portion of the gooseneck;

FIG. 9A is a plan view of the pivoting arm assembly;

FIG. 9B is a view taken along line 9B-9B of FIG. 9A;

FIG. 12A is a plan view of the sub-frame;

FIG. 12B is a view taken along lines 12B-12B of FIG. 12A;

FIG. 13A is a plan view of the support arm assembly;

FIG. 13B is a side elevation of the support arm assembly;

DETAILED DESCRIPTION OF THE PREFERRED EMBODIMENT

In the following description, the preferred embodiment of the invention will be described. However, it will be appreciated that alternative embodiments that do not necessarily embody the same constructional and design features may be implemented while still applying the broader principles of the invention.

Figure 1:
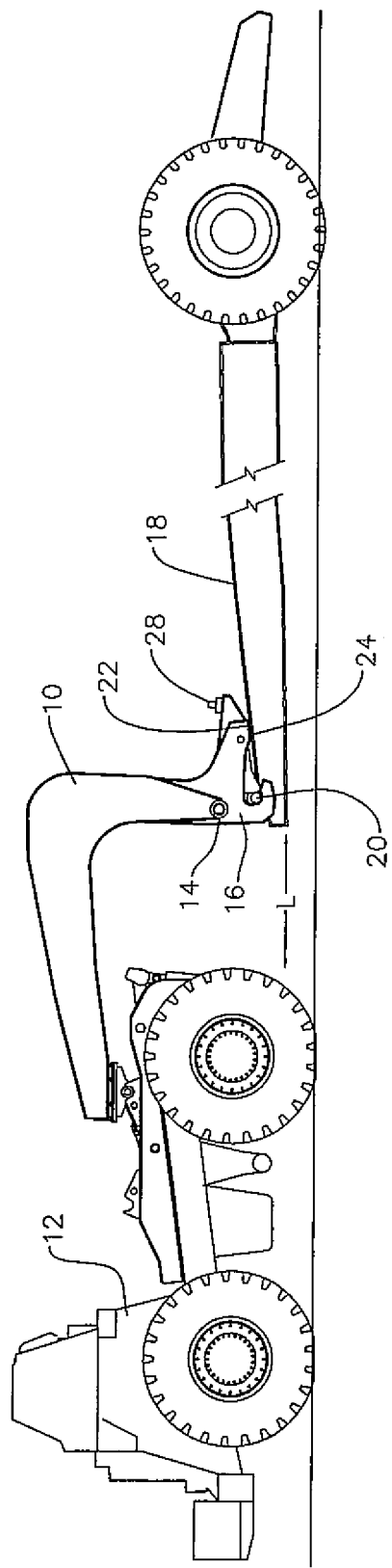
FIG. 1 is a side elevation of the preferred embodiment of the invention, showing a tractor vehicle, gooseneck and hitch assembly and a low bed deck, in low bed mode.
Figure 2:
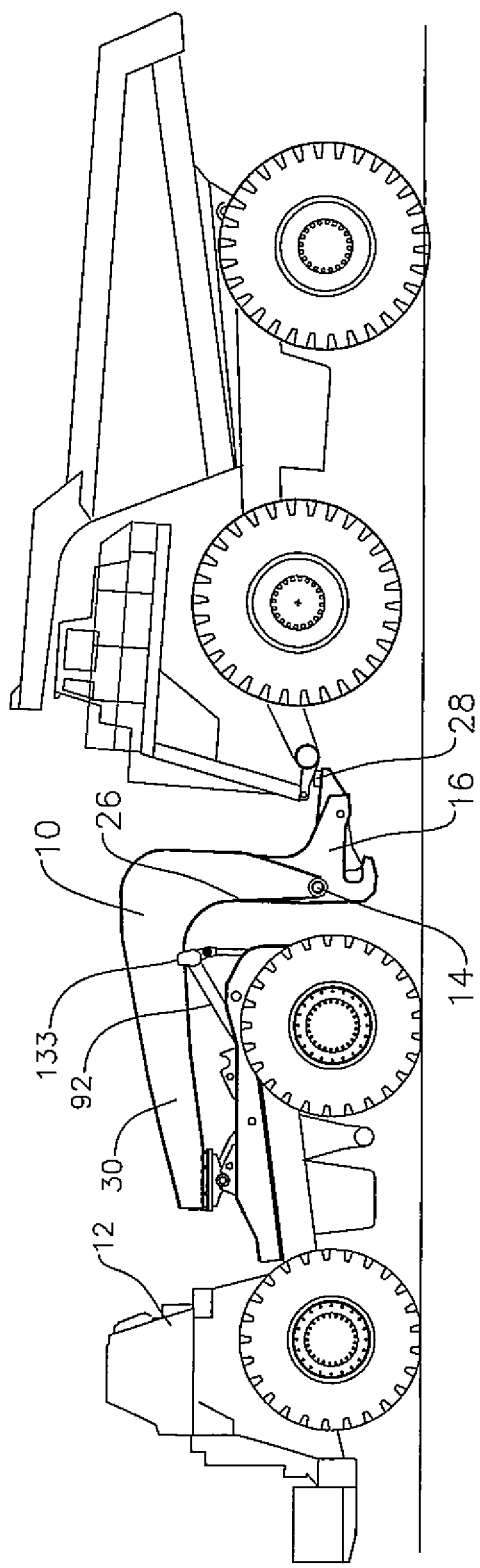
FIG. 2 is a side elevation of the preferred embodiment showing a tractor vehicle, gooseneck and hitch assembly and towed vehicle, in vehicle towing mode.
Figure 3A:
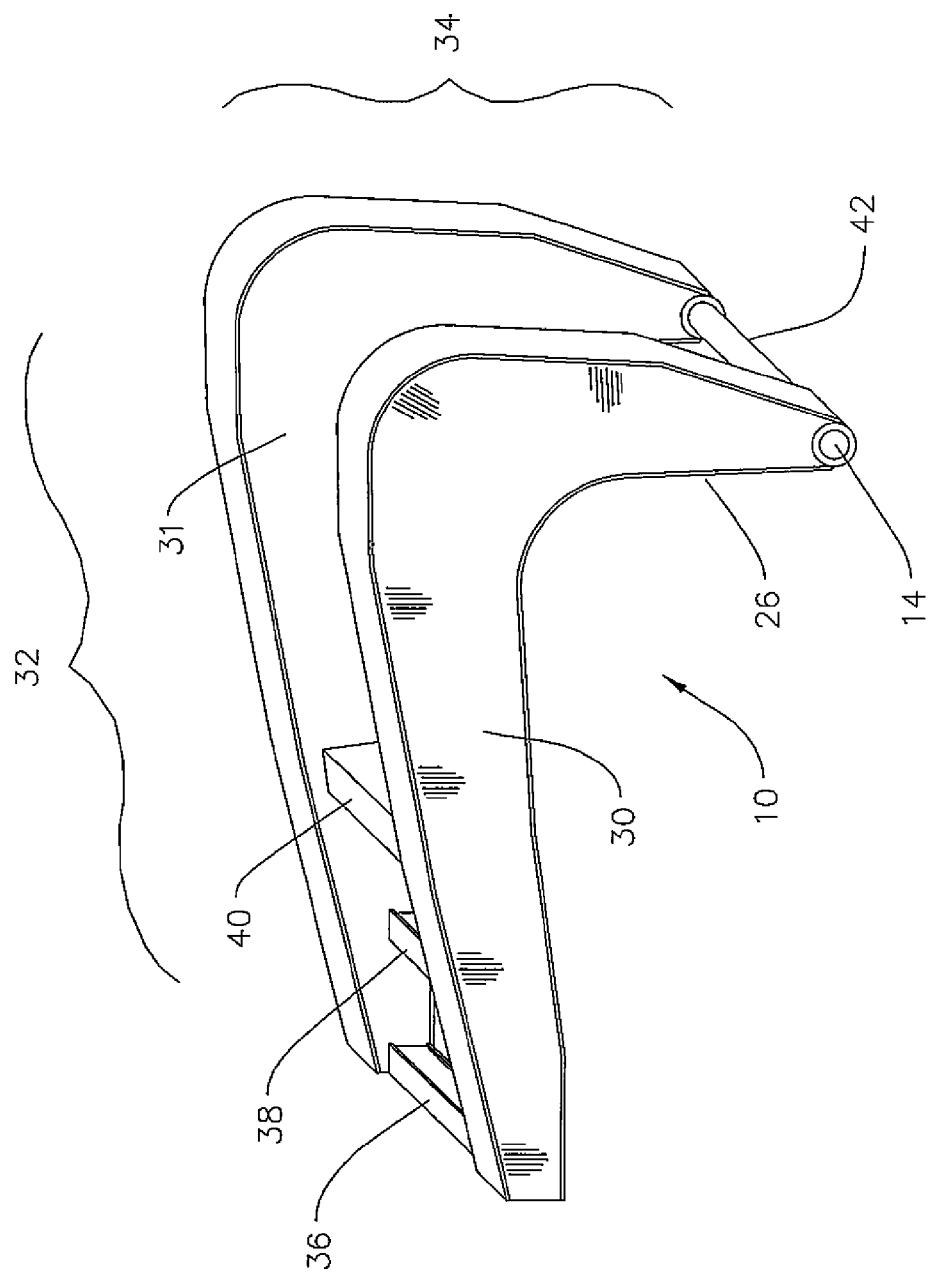
FIG. 3A is an oblique projection of the gooseneck of the preferred embodiment.
Figure 3B:
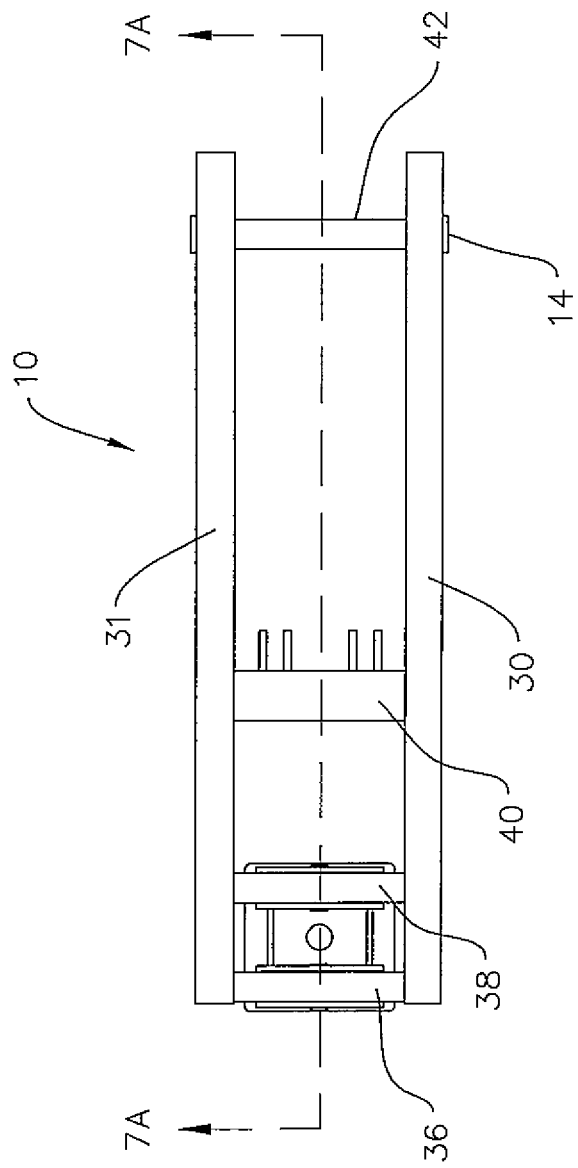
FIG. 3B is a plan view of the gooseneck of the preferred embodiment.

As is the case for many prior art detachable gooseneck trailers, the tractor, gooseneck and hitch assembly according to the preferred embodiment may be operated in two modes: the low bed mode illustrated in FIG. 1 and the vehicle towing mode illustrated in FIG. 2.

The base of a gooseneck 10 is mounted behind the cab of a tractor vehicle 12. The gooseneck 10 terminates at a pivot 14 to which a hydraulically-actuated hitch assembly 16 is pivotally attached.

In low bed mode (FIG. 1), the gooseneck 10 is in an afterward, rearmost position relative to the tractor vehicle, defining a space L between the rear of the hauling vehicle 12 and the front of the low bed 18. This allows clearance for rotation (about a vertical axis) between the low bed deck and the tractor vehicle. The hitch assembly 16 is designed to be attached to a horizontal hitch pin 20 provided on the front of the low bed 18, and a bearing surface 22 of the hitch assembly is brought into contact with a bearing portion 24 of the low bed at a position aft of the hitch pin 20. As is known, this enables the gooseneck to raise the front of the low bed deck 18 by applying torque between the hitch pin 20 and the bearing portion 24 of the low bed deck.

In vehicle towing mode (FIG. 2), the gooseneck 10 is in a forward position such that the vertical portion 26 of the gooseneck is tucked into the rear of the tractor vehicle in comparison to distance L in the low bed mode. This allows support arm 92 to provide the lifting force to lift the towed vehicle, and "captures" the neck, restricting its three degrees of freedom. The towed vehicle is hitched to a vertical hitch pin 28 that is provided at the rear of the hitch assembly 16.

Referring to FIGS. 2, 3A, 3B and 4A, the gooseneck 10 consists of two parallel L-shaped members 30, 31 each comprising a generally horizontal portion 32 and a vertical portion 34. Cross-members 36, 38 and 40 and shaft 42 extend between the L-shaped members 30, 31.

Figure 4A:
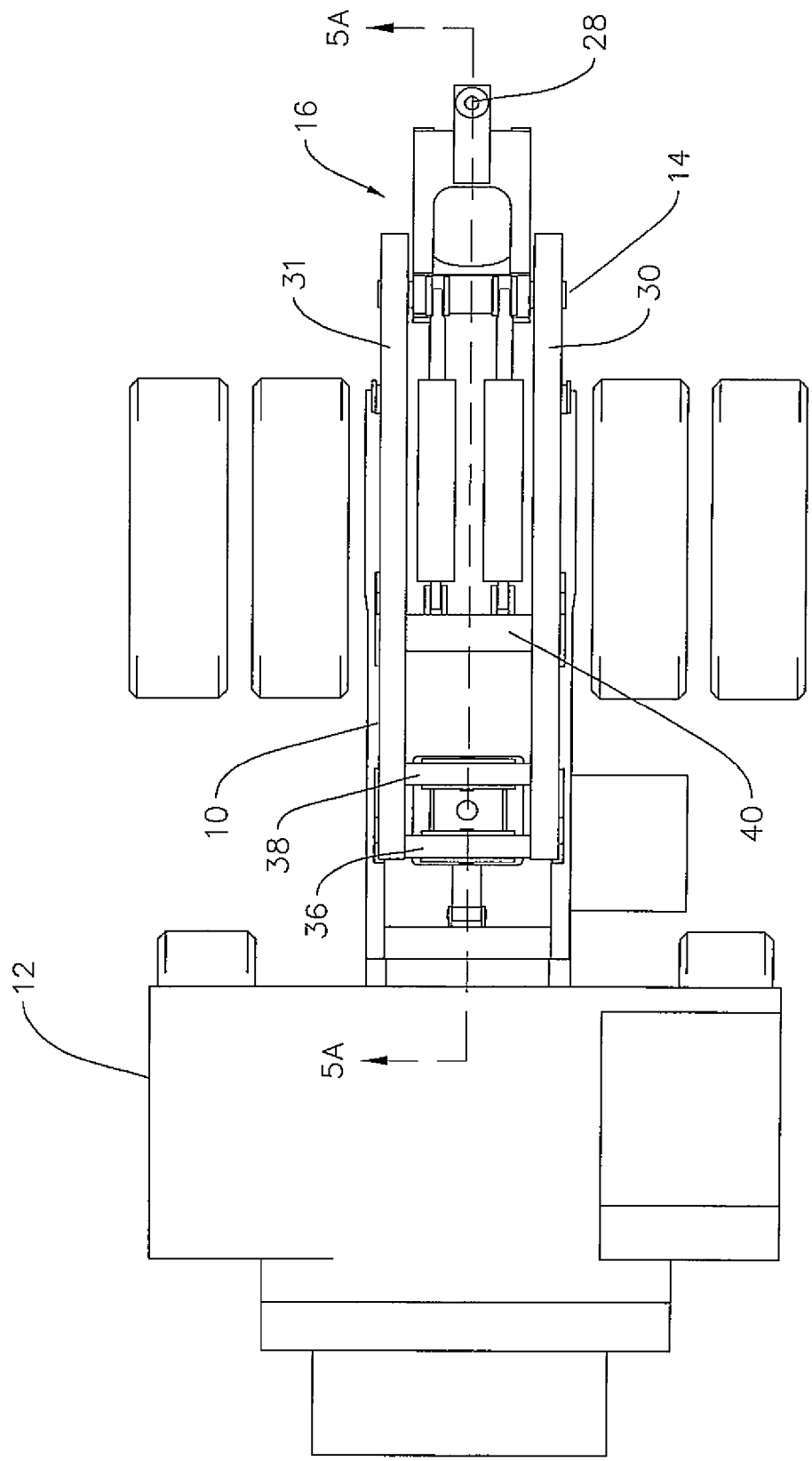
FIG. 4A is a plan view of the tractor vehicle and associated structures of FIG. 2.
Figure 4B:
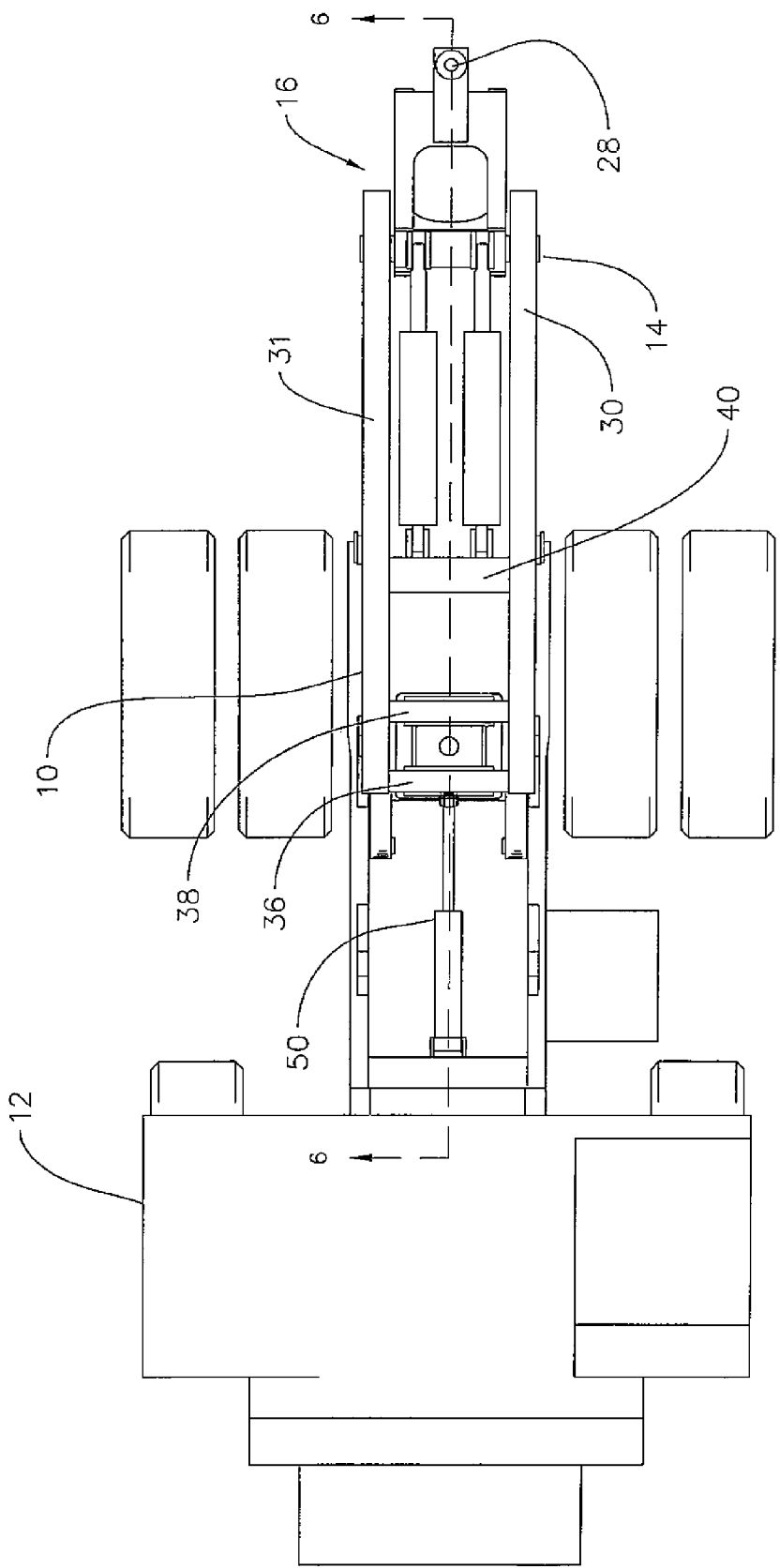
FIG. 4B is a plan view of the tractor vehicle and associated structures of FIG. 1.
Figure 5A:
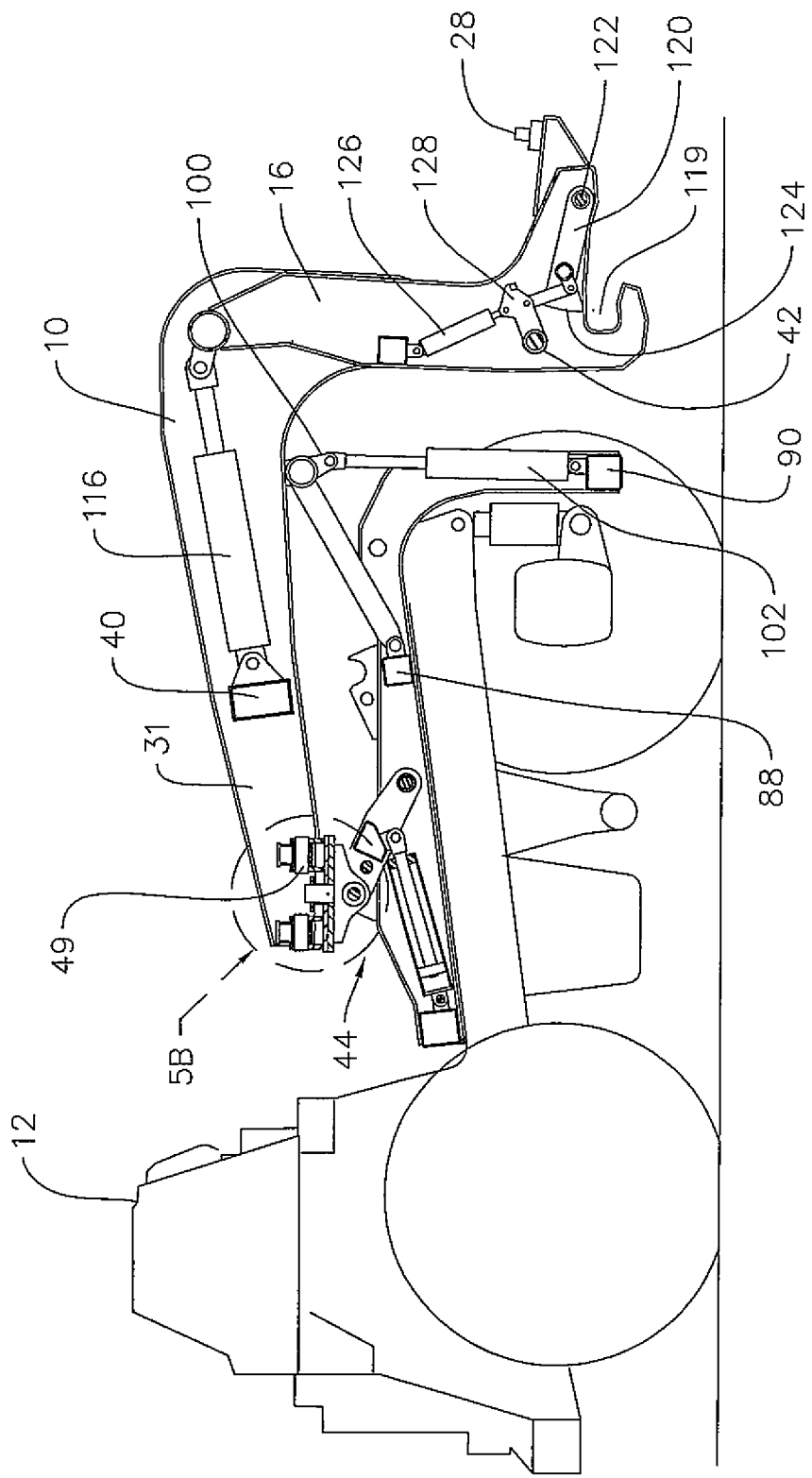
FIG. 5A is a vertical section taken along line 5A-5A of FIG. 4A.
Figure 5B:
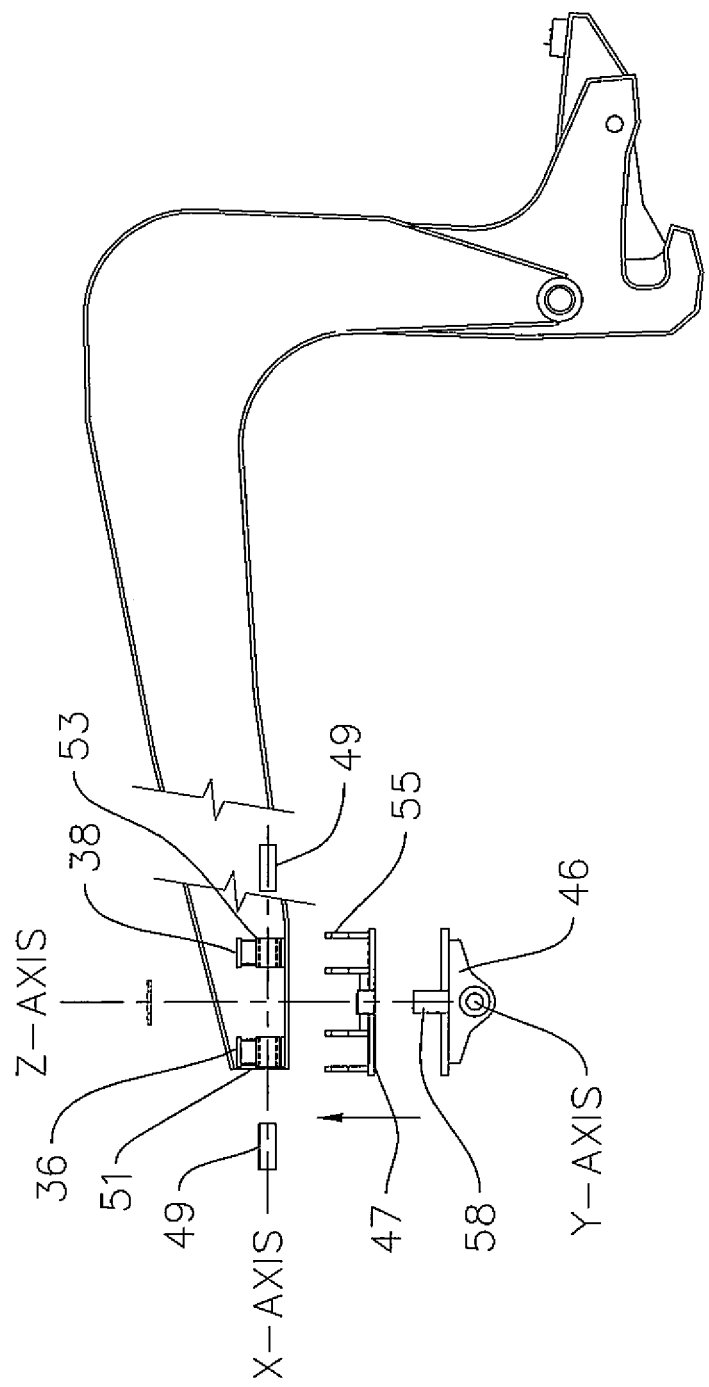
FIG. 5B is an exploded view of the pivot plate, base plate and forward portion of the gooseneck.
Figure 6:
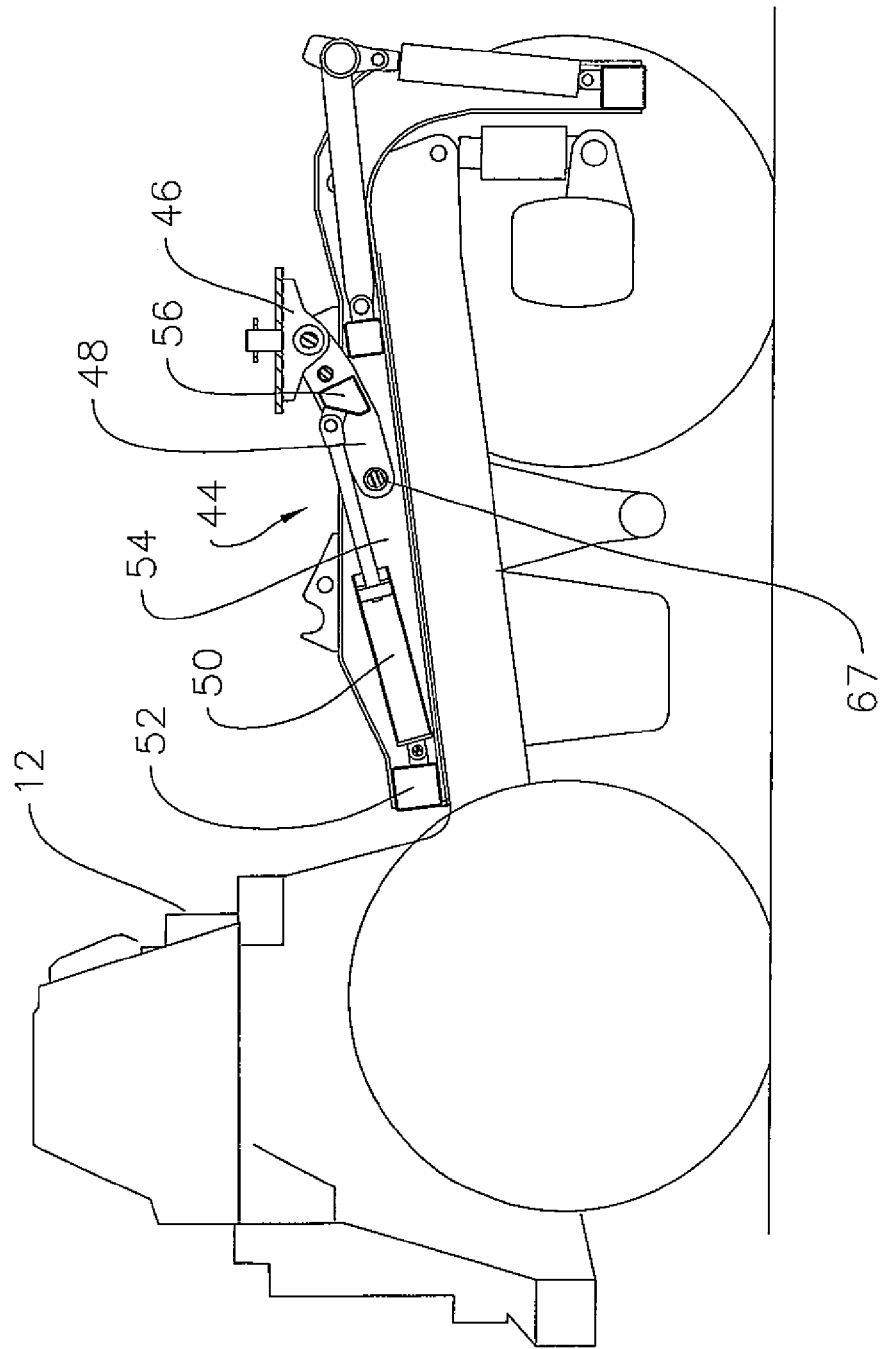
FIG. 6 is a vertical section of the tractor vehicle taken along line 6-6 of FIG. 4B, with the gooseneck removed.

As best appreciated by reference to FIG. 5A, the forward end of the gooseneck 10 is supported by an articulated support assembly 44. FIG. 5B provides an exploded view of a pivot plate 46 and a base plate 47 as well as longitudinal axis pivot pins 49. FIG. 6 is a vertical section taken along lines 6-6 of FIG. 4B but wherein the gooseneck 10 has been removed. The gooseneck support assembly 44 consists generally of a pivot member in the form of pivot plate 46, a pivoting arm assembly 48 and a hydraulic cylinder 50. One end of hydraulic cylinder 50 is secured to a forward cross-member 52 of a sub-frame 54 (which will be described in more detail below). The other end of the cylinder 50 is attached to a lug on central cross-member 56 of the pivoting arm assembly 48.

Figure 8A:
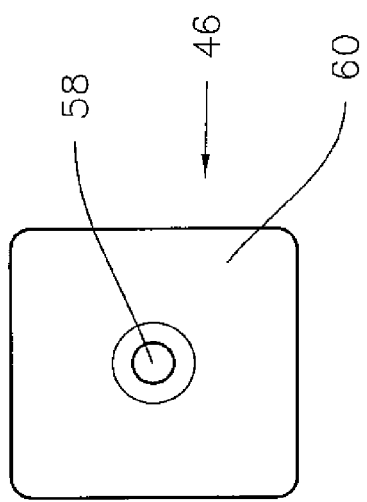
FIG. 8A is a plan view of the pivot plate.
Figure 8B:
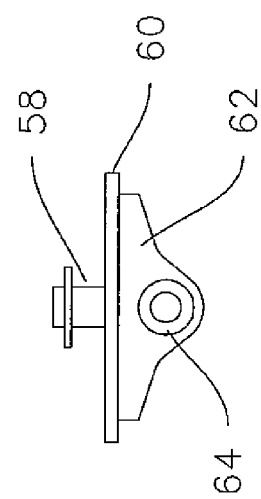
FIG. 8B is a side view of the pivot plate.

The pivot plate 46 is shown in more detail in FIGS. 8A and 8B. A vertical pivot pin 58 extends centrally of a plate 60, along a transverse axis of the tractor vehicle. The forward end of the gooseneck 10 is pivotally engaged to the pivot pin 58 enabling rotation of the gooseneck in the plane of plate 60, i.e. within the horizontal plane and about a vertical axis (designated as the z-axis in FIG. 5B). The bottom of the plate 60 includes two opposed flanges 62 each of which has a pivot aperture 64. Pivot apertures 64 are threaded by pivot shaft 66 of pivoting arm assembly 48, thereby enabling pivoting of the gooseneck in the vertical plane about an axis that is transverse to the tractor vehicle (designated as the y-axis in FIG. 5B).

Referring to FIGS. 9A and 9B, pivoting arm assembly 48 includes two arms 68, 70 joined by a central cross-member 56. Pivot shaft 66 extends between arms 68, 70. Each pivoting arm 68, 70 includes a pivot aperture 72 for receiving pivot pins 76 attached to sub-frame 54. Through such attachment, the pivot axis for the pivoting arm assembly is fixed in relation to the tractor vehicle. A hydraulic cylinder 73 actuates the extension or retraction of lock pins 75 to lock the rotation arm assembly 48 into position prior to use, as will be described below.

Referring to FIG. 5B, pivoting of the gooseneck about the longitudinal axis of the tractor vehicle (the axis designated as x-axis in FIG. 5B) is enabled by horizontal pivot elements in the form of pins 49 mounted in bearings 51, 53 within lugs 55 that extend upward from a base plate 47.

The support assembly 44 in conjunction with the x-axis pivot pins 49 provide three degrees of freedom of movement of the gooseneck: pivoting about an axis that is longitudinal to the tractor vehicle, pivoting about an axis that is vertical and pivoting about an axis that is transverse to the tractor vehicle.

Figure 10:
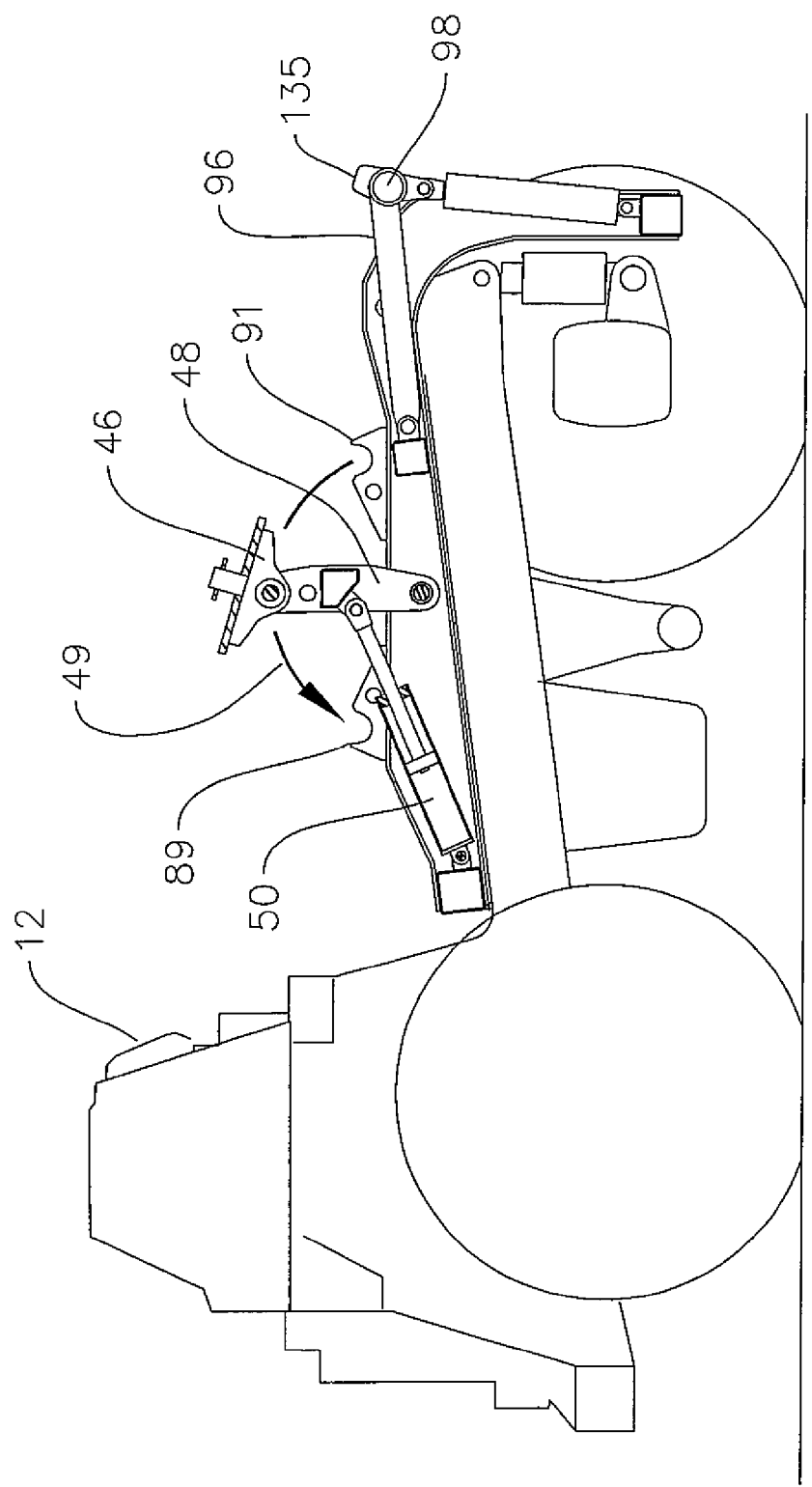
FIG. 10 is the view of FIG. 6, but with the pivoting arm assembly in an intermediate position between the low bed mode and the vehicle towing mode.

In operation, when cylinder 50 is fully extended as shown in FIG. 6, pivoting arm assembly 48 is pivoted to the rearmost position, corresponding to the low bed mode of FIG. 1. FIG. 10 shows the cylinder 50 with its piston partially retracted and pivoting arm assembly 48 in an intermediate position. When the piston is fully retracted (FIG. 11), pivoting arm assembly 48 is in its forward most position corresponding to the vehicle towing mode of FIG. 2. This arcuate motion arrangement avoids any slide track that might be contaminated by debris and it limits the moving connection between the tractor vehicle and the gooseneck to the two pivots points 67, 69 (see FIGS. 6 and 9A) on the pivoting arm assembly 48.

Sub-frame 54 (FIGS. 12A and 12B) provides the interface between the tractor vehicle and the gooseneck support assembly and the support arm assembly 92. Sub-frame 54 comprises two generally L-shaped members 82, 84 connected by cross-members 86, 88 and 90. Pivot pin 76 is threaded through pivot apertures 72 of pivoting arm assembly 48. Shaft seats 85, 87, 89 and 91 provide seats for the pivoting arm of arm assembly 48 in its forward most and rearmost positions.

Figure 11:
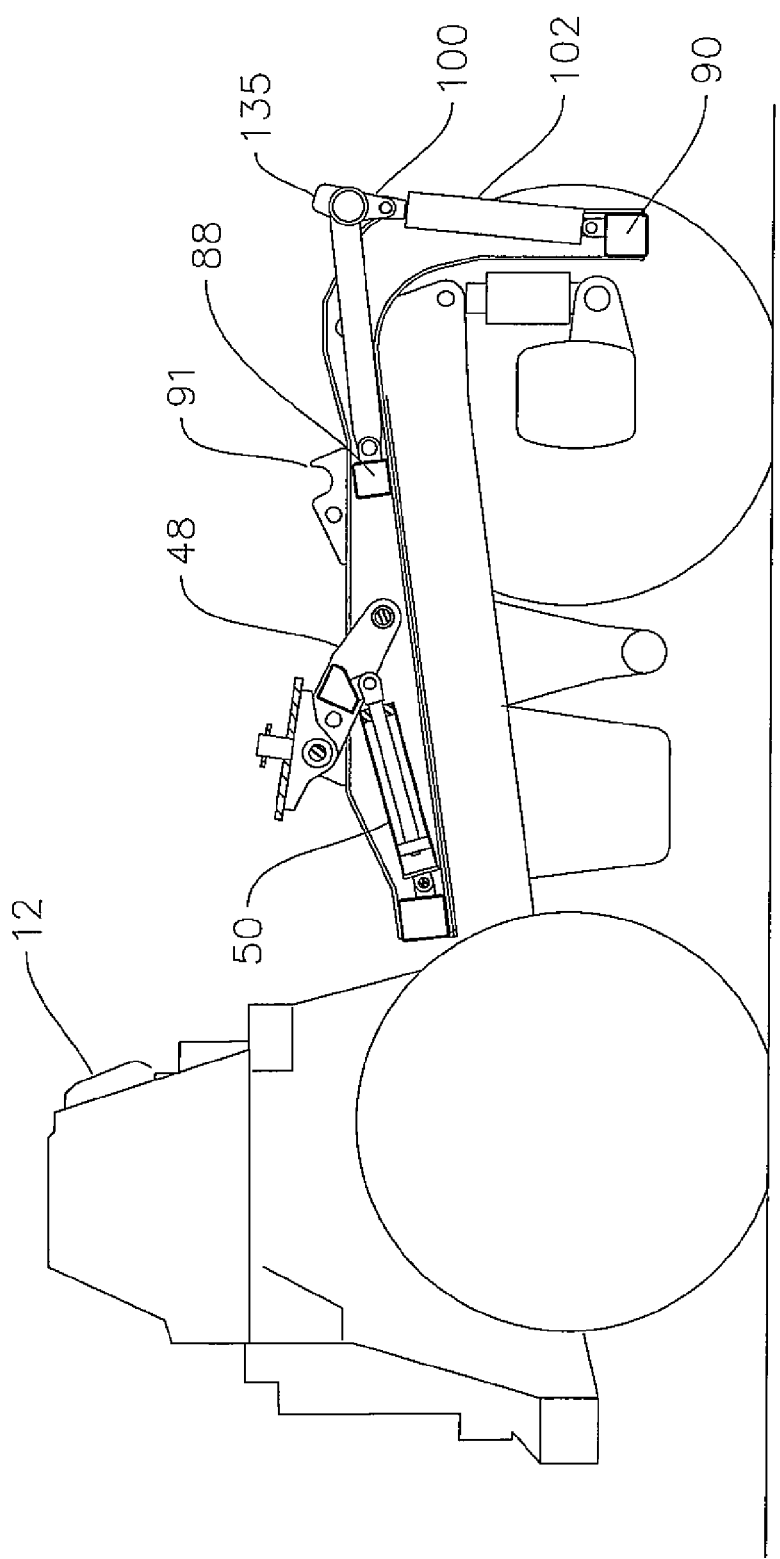
FIG. 11 is the view of FIGS. 6 and 10, but with the pivoting arm assembly in position for the vehicle towing mode.

The aft portion of the gooseneck 10 is supported by a support arm assembly 92 (FIGS. 13A and 13B) consisting of two support arms 94, 96 joined at the rear by a cross-tube 98. Cylinder mounting lugs 100 are provided at each end of cross-tube 98. The forward ends of support arms 94, 96 are pivoted on cross-member 88 of sub-frame 54. Referring to FIGS. 11 and 5A, support arm assembly 92 is used to selectively raise or lower the gooseneck 10 by means of a pair of hydraulic cylinders 102 first ends of which are secured to cross-member 90 of sub-frame 54 and the other ends of which are attached to lugs 100. Support arm assembly 92 is used to raise the gooseneck 10 when in vehicle towing mode to lift the front of the towed vehicle. It also supports the gooseneck and hitch assembly when the low bed trailer deck is not hitched.

The hitch assembly 16 will now be described by reference to FIGS. 14A, 14B and 15. Two parallel vertical arms 110, 112 are joined at their base by an aft ward extension 114. Parallel arms 110, 112 are also joined by cross member 111 and by upper web 113. Afterward-opening C-shaped recesses 117, 119 at the bottom of each arm 110, 112 accommodate a horizontal hitch shaft 20 on the low bed deck. Hydraulic cylinder 116 pivots the hitch assembly 16 about shaft 42 at the end of the gooseneck. Preferably a pair of side by side cylinders 116 is provided.

When the user wishes to hitch the tractor vehicle to a low bed deck, if the gooseneck is not already in the rearmost position shown in FIG. 1, the piston of cylinder 50 is extended to cause pivoting arm assembly 48 to rotate toward the rearmost position until extensions 13, 15 of shaft 66 of the pivoting arm assembly are seated in seats 87, 91. As the pivoting arm assembly 48 supports the pivot plate 46 which in turn supports the forward end of the gooseneck, the forward end of the gooseneck undergoes an arcuate movement 49 from the forward most to the rearmost position. Locking pins 75 are then engaged into apertures 77 provided in the seats 87, 91. Movement of the locking pins 75 is actuated by hydraulic cylinder 73. Preferably, movement of the gooseneck from the forward to the aft position is done with the base of the hitch assembly resting on the ground and with the tractor vehicle in neutral, so as to minimize stress on the gooseneck support assembly. The gooseneck support arm assembly 92 is then positioned to provide an appropriately low clearance for the hitch assembly 16 to engage the hitch shaft 20 of the low bed. Once properly positioned, the tractor vehicle is backed up to the low bed so as to fully engage the recesses 117, 119 about the hitching shaft 20. Once the hitching shaft is fully seated in the recesses 117, 119, a locking member 120 is rotated downward to the lock position.

Figure 14A:
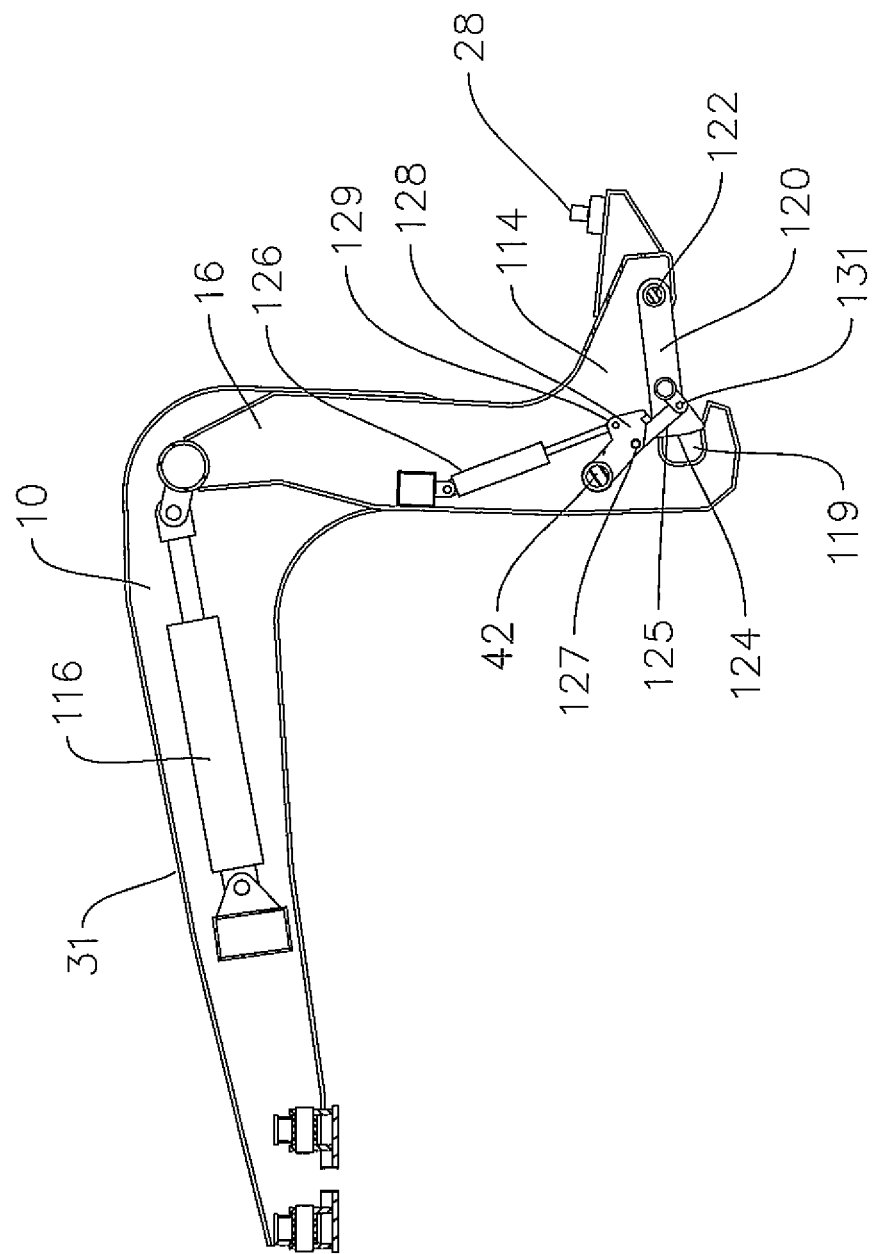
FIG. 14A is a vertical section of the gooseneck and hitch assembly with the locking paddle in lock/latched position.
Figure 14B:
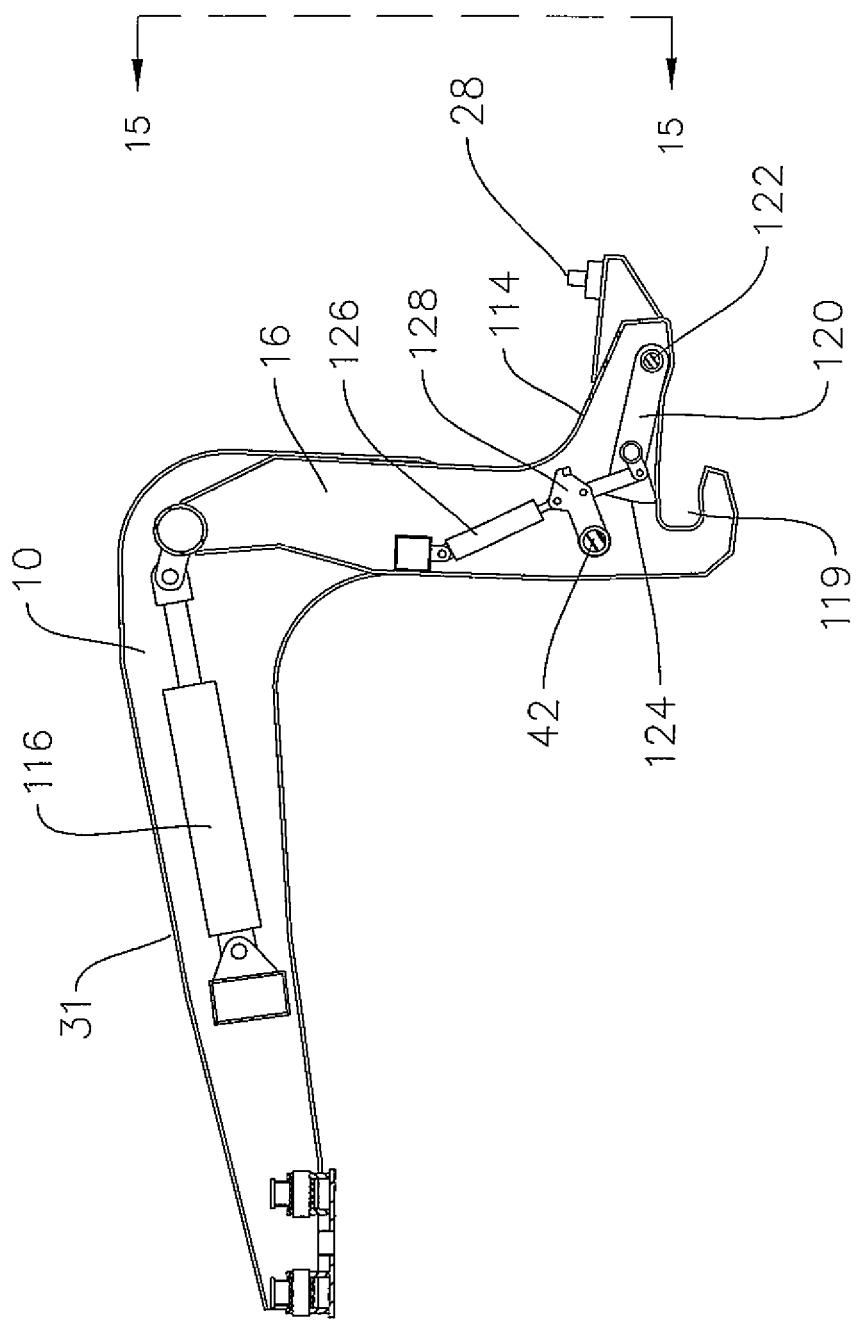
FIG. 14B is a vertical section of the gooseneck and hitch assembly with the locking paddle in unlocked position.
Figure 15:
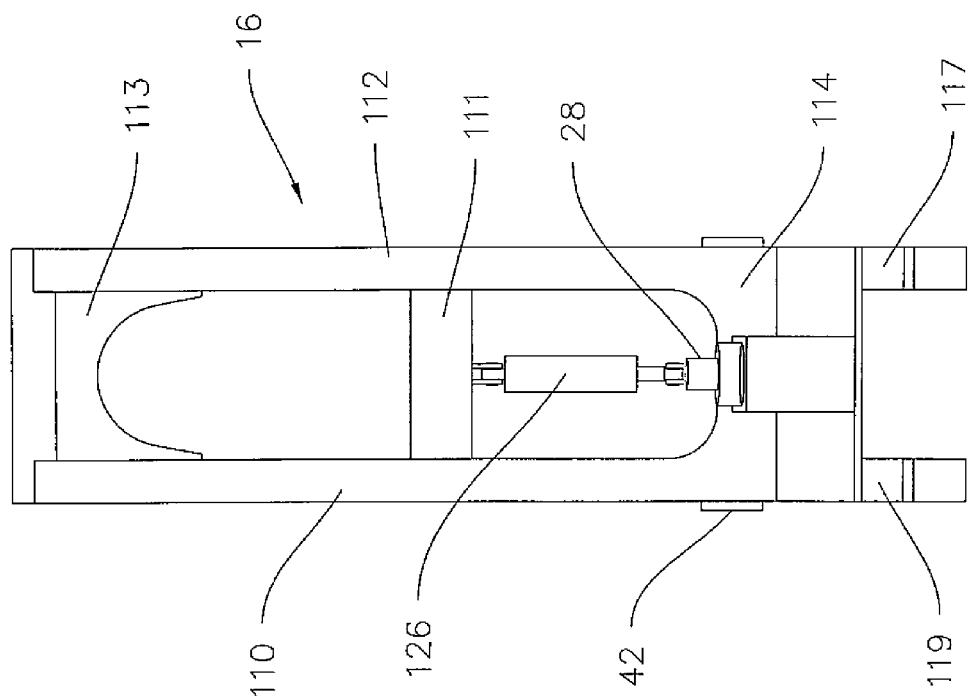
FIG. 15 is a rear view of the hitch assembly only taken from approximately lines 15-15 of FIG. 14B.

Referring to FIG. 14A, a locking member in the form of paddle 120 is pivoted from a point 122 on hitch assembly 16 that is located aft of the recesses 117, 119. The forward end of paddle 120 includes a substantially flat surface 124 for abutting the aft side of the hitching shaft 20 to retain hitching shaft 20 in recesses 117, 119 when the trailer is being towed. A cylinder 126 actuates pivoting of the paddle through an over center cam rotating member 128 pivoted on pivot shaft 42. Over center cam member 128 is pivotally attached to link member 125 at a point 127 and is pivotally attached to the piston of cylinder 126 at a point 129 that is angularly displaced in relation to point 127. Link member 125 is pivotally attached at point 131 on a lug on paddle 120. When the piston of cylinder 126 is fully extended, paddle 120 is pivoted to engage the hitching shaft 20 and the over center cam member 128 is rotated to a latched position in relation to the paddle.

When the paddle 120 is in the lock position, three pivot points are substantially aligned: the pivot point 42 of the over center cam member, the pivot 127 between the over center cam member 128 and the link member 125, and the pivot 131 between the link member 125 and the paddle 120. The aligned pivots provide mechanical resistance to articulation of the paddle thereby offering a failsafe if the hydraulic cylinder fails.

The piston of cylinder 116 is then extended to pivot the hitch assembly 16 about the pivot 42 causing bearing surface 22 to bear down against the surface of the low bed at point 24 that is aft of the hitching shaft 20. This raises the front of the low bed and provides a secure hitch. Once the deck is properly secured, support arm assembly 92 is lowered to its lowest position to allow full play to the vertical, longitudinal and transverse axis pivotability of the forward end of the gooseneck.

The low bed deck 18 may be disengaged from the gooseneck assembly by retracting the piston of cylinder 116 to relieve the torque between the hitching shaft 20 and point 24 on the deck, retracting the piston from cylinder 126 to disengage the paddle lock, raising the support arm 92 to support the gooseneck and driving the tractor vehicle away from the deck 18.

In order to attach the tractor vehicle and gooseneck assembly to a vehicle to be towed, pivoting arm assembly is rotated to the forward most position, with extensions 13, 15 of shaft 66 seated in seats 85, 89 of sub-frame 54. This moves the vertical portion of the gooseneck forward toward the rear of the tractor vehicle. Locking pins 75 are engaged into apertures 79 in seats 85, 89. Preferably, this is done with the tractor vehicle in neutral and the base of the hitch assembly resting on the ground (support arm assembly 92 fully lowered). Once the gooseneck is in the forward position, support arm 92 is then raised to lift the hitch 16 just clear of the ground. The tractor vehicle is then reversed to position the vertical hitch pin 28 under the vehicle to be towed. Support arm assembly 92 is then raised to raise the gooseneck and the attached hitch assembly and to lift the front end of the towed vehicle. Once supported by support arm 92, gooseneck articulation is restricted in the x-axis by arm 92 bearing on gooseneck members 30, 31 and in the y-axis by the 3 points of contact (arm 92 on members 30, 31, and plate 47 on plate 60) and in z-axis by the flanges 133, 135 on the ends of support arm 92. These flanges capture members 30, 31 and restrict z-axis rotation. There nonetheless remain the 3 degrees of freedom inherent in the hitch 28 to allow the required movement between the tractor and the towed vehicle.

As noted above, in order to effect a transition of the gooseneck and hitch assembly from the low bed mode to the vehicle towing mode, support arm assembly 92 may be lowered fully so that the base of the hitch assembly 16 rests on the ground. The tractor vehicle is then put into neutral gear. The piston of hydraulic cylinder 50 is then retracted to rotate the pivoting arm assembly 48 from the rearmost to the forward most position. As the pivoting arm assembly 48 completes its travel through the arc, the bulk of the weight of the gooseneck and hitch assembly is borne by the ground. As the pivoting arm assembly 48 travels between its two extremes, the tractor vehicle may be urged rearward to track the movement of the pivoting arm assembly. The reverse sequence is used to transition from the vehicle towing mode to the low bed mode. This mechanism and method of transitioning between the two modes presents considerably less stress on the gooseneck support assembly than would be the case by simply articulating the entire weight of the gooseneck and hitch assembly without laying the hitch assembly 16 on the ground.

The invention therefore provides a mechanism for arcuate travel of the gooseneck support assembly (and therefore the forward end of the gooseneck) that not only limits the ability of contaminants to jam the assembly, but it also provides three degrees of freedom of movement for the gooseneck in relation to the tractor vehicle in low bed mode and restricts those degrees of freedom in vehicle towing mode. The locking member arrangement provides an inherent failsafe for securing the low bed deck hitch shaft into the hitch assembly.

It will be appreciated by those skilled in the art that the preferred and alternative embodiments have been described in some detail but that certain modifications may be practiced without departing from the principles of the invention.

The invention claimed is:

1. A gooseneck hitching apparatus for mounting on a tractor vehicle to enable a releasable connection between said tractor vehicle and a low bed trailer deck, said apparatus comprising a gooseneck having a substantially horizontal portion and a substantially vertical portion, said substantially horizontal portion having a forward end, said horizontal portion and said forward end being selectively positionable in an aftward position for hitching said apparatus to said low bed trailer deck or in a forward position, wherein a transition of said horizontal portion and of said forward end between said aftward and forward positions is effected by arcuate movement of said forward end of said gooseneck in relation to said tractor vehicle.

2. The apparatus of claim 1 wherein said forward end of said gooseneck is operatively coupled to a pivoting arm having a pivot axis that is fixed in relation to said tractor vehicle and said arcuate movement is actuated by pivoting of said arm.

3. The apparatus of claim 2 wherein in low bed mode, said forward end of said gooseneck is pivotable in relation to said tractor vehicle about a vertical axis, about an axis that is transverse to said tractor vehicle and about a longitudinal axis of said tractor vehicle.

4. The apparatus of claim 3 wherein said forward end of said gooseneck is operatively coupled to said pivoting arm by a pivot member, said pivot member being pivotally secured to said arm about said transverse axis.

5. The apparatus of claim 4 wherein said pivot member includes a vertical pin providing said vertical axis.

6. The apparatus of claim 5 wherein said forward end of said gooseneck is operatively coupled to at least one horizontal pivot element defining said longitudinal axis.

7. A gooseneck hitching apparatus for mounting on a tractor vehicle to enable a releasable and lockable connection between said tractor vehicle and a low bed trailer deck, comprising at least one aftward-opening hitch recess for receiving a hitching shaft of said low bed trailer deck, a locking member that pivots about a first pivot point that is aftward of said hitch recess, said locking member further comprising a substantially flat surface for abutting said hitching shaft in said recess in a locking position and being retracted from said recess in an unlock position.

8. The apparatus of claim 7 wherein said hitch recess is provided on a hitch assembly that is pivotally attached to an aft end of said gooseneck.

9. The apparatus of claim 8 wherein said hitch assembly further comprises a vertical hitch pin for use in towing a vehicle.

10. The apparatus of claim 7 wherein pivoting of said locking member is actuated by a hydraulic cylinder that actuates rotation of a rotating member.

11. The apparatus of claim 10 wherein said rotating member is operatively coupled to said locking member by a link that is pivotally attached to said rotating member and to said locking member.

12. The apparatus of claim 11 wherein when said locking member is in said locking position, the following three pivot points are substantially aligned: a second pivot point about which said rotating member rotates, a third pivot point about which said link pivots in relation to said rotating member, and a fourth pivot point about which said link pivots in relation to said locking member, whereby to provide mechanical resistance to rotation of said locking member out of said locking position.

13. The apparatus of claim 1 further comprising an upwardly pointing vertical hitch pin for use in towing a vehicle.

14. In a tractor vehicle having a gooseneck hitching apparatus mounted thereon for enabling a releasable connection between said tractor vehicle and a low bed trailer deck, a transition of a gooseneck hitching apparatus between an aftward position and a forward position being effected by arcuate movement of a forward end of said gooseneck, a method of effecting said transition comprising:

lowering an aft portion of said gooseneck hitch assembly to rest on the ground; and,
effecting said arcuate movement.

15. The method of claim 14 further comprising placing said tractor vehicle in neutral gear prior to actuating said arcuate movement.

16. The apparatus of claim 6 further comprising at least one hydraulically operated lifting arm for lowering, raising or supporting an aft portion of said gooseneck.

17. The apparatus of claim 16 wherein said at least one lifting arm comprises a lateral flange for restricting pivoting of said gooseneck about said vertical axis when said gooseneck is supported by said lifting arm.

* * * * *